(12) United States Patent
Liu

(10) Patent No.: US 9,262,513 B2
(45) Date of Patent: Feb. 16, 2016

(54) SEARCH METHOD AND APPARATUS

(75) Inventor: Jian Liu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 13/521,274

(22) PCT Filed: Jun. 21, 2012

(86) PCT No.: PCT/US2012/043576
§ 371 (c)(1),
(2), (4) Date: Jul. 10, 2012

(87) PCT Pub. No.: WO2012/177901
PCT Pub. Date: Dec. 27, 2012

(65) Prior Publication Data
US 2012/0330941 A1 Dec. 27, 2012

(30) Foreign Application Priority Data

Jun. 24, 2011 (CN) .......................... 2011 1 0172715

(51) Int. Cl.
G06F 17/30 (2006.01)
(52) U.S. Cl.
CPC ...... *G06F 17/30675* (2013.01); *G06F 17/3053* (2013.01)
(58) Field of Classification Search
CPC ........................ G06F 17/30675; G06F 17/3053
USPC .......................................................... 707/723
See application file for complete search history.

(56) References Cited

U.S. PATENT DOCUMENTS

| 7,769,746 | B2 | 8/2010 | Lu et al. | |
| 7,974,885 | B1 * | 7/2011 | Bowman et al. | 705/26.1 |
| 8,285,718 | B1 * | 10/2012 | Ong et al. | 707/737 |
| 2003/0033298 | A1 | 2/2003 | Sundaresan | |
| 2003/0105677 | A1 * | 6/2003 | Skinner | 705/26 |
| 2004/0122808 | A1 * | 6/2004 | Martin et al. | 707/3 |
| 2005/0071255 | A1 * | 3/2005 | Wang et al. | 705/27 |

(Continued)

FOREIGN PATENT DOCUMENTS

| CN | 101751434 A | 6/2010 |
| CN | 101887437 A | 11/2010 |

(Continued)

OTHER PUBLICATIONS

PCT Search Report mailed Aug. 28, 2012 for PCT application No. PCT/US12/43576, 7 pages.

(Continued)

*Primary Examiner* — Jensen Hu
(74) *Attorney, Agent, or Firm* — Lee & Hayes, PLLC

(57) ABSTRACT

A computing device may identify multiple search results that have relatively high correlation with the keyword. The device may determine multiple additional search results based on the corresponding relationships among the keyword, the multiple additional search results, and transaction parameters. The device may list the search results related to the degree of transaction success on the top and the search results related to the correlation on the bottom. The transactional parameters may be determined based on a click index and a purchase index that are associated with the keyword and each search result of the multiple additional search results. The click index and the purchase index may be generated in a predetermined time period.

20 Claims, 3 Drawing Sheets

(56) References Cited

U.S. PATENT DOCUMENTS

| | | |
|---|---|---|
| 2005/0240580 A1 | 10/2005 | Zamir et al. |
| 2005/0251496 A1 | 11/2005 | DeCoste et al. |
| 2006/0004892 A1* | 1/2006 | Lunt et al. .................. 707/204 |
| 2006/0085280 A1 | 4/2006 | Murnan et al. |
| 2006/0136378 A1 | 6/2006 | Martin |
| 2006/0287980 A1 | 12/2006 | Liu et al. |
| 2007/0011142 A1 | 1/2007 | Sattler et al. |
| 2008/0082528 A1 | 4/2008 | Bonzi et al. |
| 2008/0097969 A1* | 4/2008 | Lee et al. ...................... 707/3 |
| 2008/0172362 A1* | 7/2008 | Shacham et al. ............... 707/3 |
| 2008/0201304 A1* | 8/2008 | Sue ................................. 707/3 |
| 2008/0208841 A1* | 8/2008 | Zeng et al. ..................... 707/5 |
| 2008/0281817 A1* | 11/2008 | White et al. .................... 707/6 |
| 2009/0106221 A1 | 4/2009 | Meyerzon et al. |
| 2010/0042474 A1 | 2/2010 | James |
| 2010/0262495 A1 | 10/2010 | Dumon et al. |
| 2010/0262602 A1 | 10/2010 | Dumon et al. |
| 2011/0184883 A1 | 7/2011 | El-Charif et al. |
| 2011/0184941 A1 | 7/2011 | El-Charif et al. |
| 2012/0116905 A1 | 5/2012 | Futty et al. |

FOREIGN PATENT DOCUMENTS

| | | |
|---|---|---|
| CN | 102004782 A | 4/2011 |
| CN | 102073699 A | 5/2011 |
| EP | 2336905 A1 | 6/2011 |
| WO | WO2007078033 | 7/2007 |

OTHER PUBLICATIONS

Chinese office action dated Aug. 5, 2014, for corresponding Chinese Application No. 201110172715.1, 18 pages.

Chinese Office Action dated Feb. 3, 2015, for corresponding Chinese Application No. 201110172715.1, 14 pages.

Chinese Office Action dated Jul. 14, 2015, for corresponding Chinese Application No. 2011101727151, 5 pages.

Extended European Search Report mailed Sep. 1, 2015 for European Patent Application No. 12803357.8, 8 pages.

\* cited by examiner

SEARCH METHOD AND APPARATUS

CROSS REFERENCE TO RELATED PATENT APPLICATIONS

This application is a national stage application of an international patent application PCT/US12/43576, filed Jun. 21, 2012, which claims priority to Chinese Patent Application No. 201110172715.1, filed on Jun. 24, 2011, entitled "a Search Method and Apparatus," which applications are hereby incorporated by reference in their entirety.

TECHNICAL FIELD

This disclosure relates to the field of search technologies. More specifically, the disclosure relates to search methods and devices.

BACKGROUND

Along with development of computer network technologies and mobile technologies, search services have been more and more extensively applied. In addition to network-wide searches conducted on professional search websites, most websites have capabilities to conduct searches on local websites. For websites having abundant data, such as shopping websites, it is particularly important for a website to grow its businesses by finding desired search results based on keywords input by users.

According to conventional search methods, a search server conducts searches in a website database that might have a large number of items or data objects. These searches are conducted based on keywords to obtain the data objects matching the keywords. To better present useful information to users, correlations of search results corresponding to keywords may be calculated respectively. The search results are then ranked based on correlations.

The conventional search methods obtain search results and display them in an order. Some useful information may be arranged at bottom positions if search results are sorted base only on literal correlations with keywords. For example, suppose that the query is "Brand A cell phone," and the search server finds two search results. The first search result is a webpage that briefly describes the "Brand A cell phone", and the second search result is a webpage with texts and images to describes the "Brand A cell phone" and a "Brand B cell phone". For literal correlations, the first search result has a higher correlation than the second search result does. On a specific website, such as a shopping website, the second search result has more useful information than the first search result. The second search result therefore can better meet search needs of users. Therefore, search results sorted based only on literal correlations with keywords may not match the user's needs.

SUMMARY

This disclosure provides search methods and devices for solving the problems of conventional search methods, such as low search efficiency and waste of system resources.

When receiving a search query that contains a keyword, the devices may use the keyword as a search condition to obtain search results by searching a database server. Based on corresponding relations among the keyword, the search results and transaction parameters of the search results, the devices may determine multiple search results that have transaction parameters satisfying a set condition and corresponding to the keyword. The devices may then list and/or rank the search results and return the ranked search results to a user device.

A computing device may comprise a first search module, a second search module, a sorting module, and a result returning module. When receiving a search request that contains a keyword, the first search module may use the keyword as the search condition to obtain search results by searching the database server. The second search module may determine multiple search results based on corresponding relations among the keyword, the search results and the transaction parameters of the search results. The multiple search results correspond to the received keyword and have transaction parameters satisfying at least one set condition. The sorting module may list and/or rank the search results by placing the multiple search results on the top. The result returning module may return the sorted search results.

According to the embodiments of this disclosure, the received keyword is used as the search condition to obtain search results having relatively high correlation with the keyword by searching the database server. Also, based on corresponding relations among keywords that have been learned in advance, the search results and the transaction parameters of the search results, multiple search results that have relatively high transaction parameters are determined. The search results related to degrees of transactional successes are listed on the top, while search results related to the correlation are listed on the bottom. Since the search results listed on the top are those having high probabilities to make purchases, the probability that the search results listed on the top meet needs of user queries is also high. This can effectively reduce search time and therefore improve search efficiency. Since a user can complete a search process based on the search results listed on the top, there is no need to click and to query or investigate the search results for a number of times. This can reduce the system resources allocated by network servers to the user's operations of clicks to query or investigate, and therefore save system resources. Moreover, the present technology can effectively improve a user's rate of successful transactions after searches. The user needs to try a small amount of keywords before selecting a product to buy. Since the keywords used by the user are fewer comprised to the conventional search methods, the resources allocated by servers to the user's search process can be reduced. As a result, the limited resources of a server can support more users to search.

BRIEF DESCRIPTION OF THE DRAWINGS

The Detailed Description is described with reference to the accompanying figures. The use of the same reference numbers in different figures indicates similar or identical items.

DETAILED DESCRIPTION

The present disclosure provides a new search technology to sort search results. A computing device may receive from a user device a query containing a keyword. The device may conduct searches to obtain M search results. These M search results may have relatively high correlations with the keyword. The device may determine N multiple search results based on corresponding relations among keywords, corresponding search results and transaction parameters of the search results. The N search results may have relatively high transaction parameters. The transaction parameters may be determined based on click indexes and/or purchase indexes that are generated in a predetermined time period. After the M search results and the N search results are identified, the device may list the N search results prior to the M search results.

The search results mentioned in some embodiments of this disclosure may include data objects in website databases, such as webpages and data packets. The transaction parameters in some embodiments of this disclosure may indicate probabilities that when a user obtains a search result by using a certain keyword, the user queries or investigates the search result and/or makes purchases an item associated with the search result (i.e. successful transactions after the user queries or investigates certain search results corresponding to certain keywords).

Figure 1:
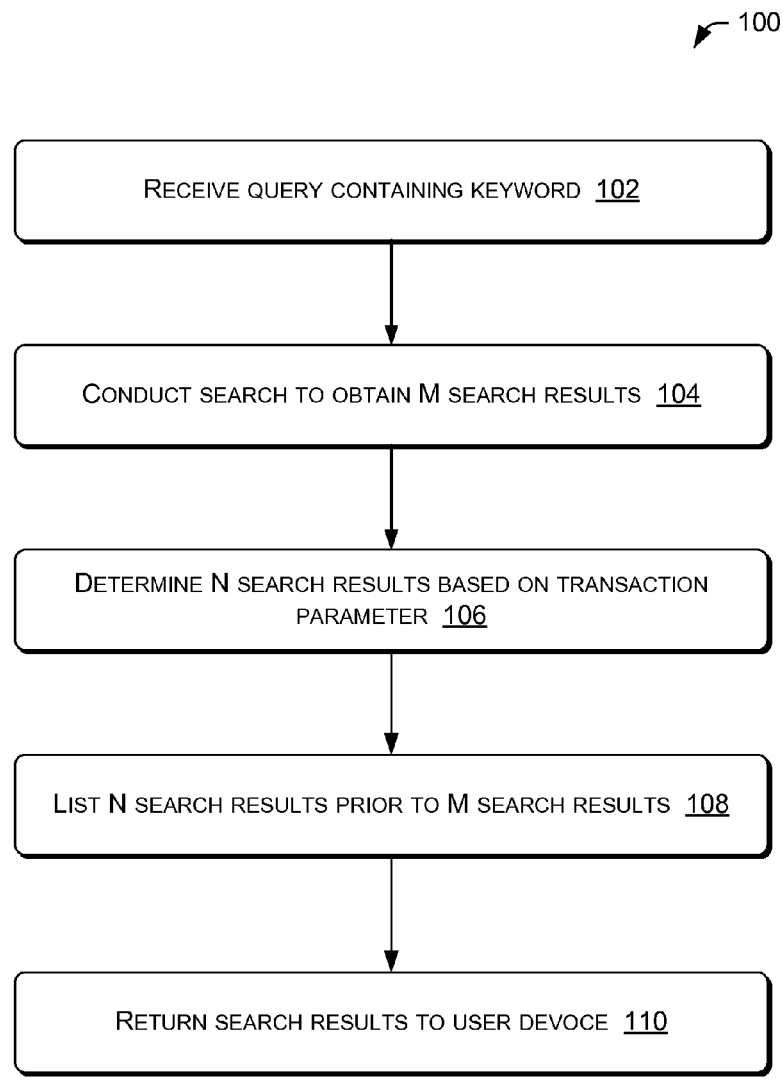
FIG. 1 is a flow diagram of an illustrative process to conducting searches.

FIG. 1 is a flow diagram of an illustrative process 100 to conducting searches. At 102, a computing device may receive a search query that contains a keyword. When a user wants to carry out a search operation, the user will send a search request and the search request will carry a keyword as the search condition.

At 104, the device may conduct searches using the keyword as the search condition. The device may obtain M search results by searching the database server, where M is a positive integer. The device may read the keyword in the search query, establish a link with the database server, and identify M search requests that have relatively high correlation with the keyword from the database server. Since these M search results have relatively high correlation with the keyword, they are probably the search results that the user desires to view.

The search process according to this operation may be a process of a search based on literal correlations with the keyword. The search process may also be a process of a search based on additional literal correlation searches. The device may identify search results that the user is interested in by investigating a website's log information. It should be noted that this operation is not limited to the above search methods. All other methods capable of identifying search results according to keywords may be applied in this operation.

At 106, based on the corresponding relations among the keyword, the search results and the transaction parameters of the search results, the device may determine N search results corresponding to the received keyword that have transaction parameters satisfying a set condition, where N is a positive integer.

Upon receiving a search query, M search results that are correlated to the keyword are determined by searching the database server according to operation 102. Moreover, based on the corresponding relations among keywords obtained through local studies, the search results and the transaction parameters of the search results, N search results corresponding to the received keyword that have transaction parameters satisfying a set condition are determined Operation 106 may determine the N search results from the database server based on the corresponding relations, and may determine the N search results from the search results saved locally based on the corresponding relations.

In some embodiments, the N search results may refer to the search results that have relatively high rates of successful transactions (i.e. previously within a set period, the probability that users made purchases after querying these N search results is relatively high). Since these N search results may satisfy the need of users in inquiries and purchases very well previously within a set period, the probability that these N search results may satisfy the need in inquiries and purchases of the user who submits a search request this time is relatively high.

It should be noted that the execution sequence of operations 104 and 106 in this disclosure may not be fixed. For example, operation 106 may be executed first, followed by 104. Alternatively, operations 104 and 106 may be executed simultaneously.

At 108, the device may place the N search results on the top, while other search results in the M search results that are not the same as the N search results are listed on the bottom. The N search results obtained in 106 are identified by using transaction parameter as the condition. Compared with the M search results that are identified in 102 using correlation with the keyword as the condition, these N search results can both reflect correlations with the keyword to certain degree and indicate usability of the search results. As a result, the N search results can better reflect needs of the user in inquiries. In this operation, the N search results are arranged before the M search results.

For example, a user logs onto a shopping website, enters "Brand A cell phone" in the search box of the website as a keyword, and thus starts a search query. Upon receiving the search request, three search results are obtained in the website's database server by using "Brand A cell phone" as the keyword, which are Search Result 1, Search Result 2, and Search Result 3, respectively. According to the search results obtained by other users when using "Brand A cell phone" as the keyword in searching, as well as inquiries and purchases by users on the obtained search results with "Brand A cell phone" as the keyword, in the previous 1 week, two search results that have relatively high transaction parameters are ultimately determined. For example, these two search results are Search Result 2 and Search Result 4. At this moment, Search Result 2 and Search Result 4 are search results that a number of users queried and purchased. Therefore, Search Result 2 and Search Result 4 are useable and valid search results, which should be listed on the top. Although Search Result 1 and Search Result 3 have high correlation with the keyword, they may have issues in usability and validity. In Search Result 1, for example, the linked product has false information, such as poor quality, overly high price or overly low price. Therefore, Search Result 1 and Search Result 3 should be listed on the bottom.

Since search results saved in a database server keep changing, the search results currently saved in the database server may not necessarily be completely the same as the search results that are used previously in a set period for learning to obtain corresponding relations. At the same time, the N search results determined according to the corresponding relations are determined according to the values of transaction parameters. The M search results identified in operation 102 are determined according to the correlation with the keyword. As a result, the M search results in 104 are very likely not completely the same as the N search results in operation 106.

In some embodiments, the N search results may likely store search results that have relatively high correlation with the keyword as well. As a result, the N search results may probably overlap with the M search results. To avoid the repeated display of the same search results, while sorting, the device may arrange the distinctive N search results on the top. The device may then eliminate the search results in the M search results that are substantially the same as the N search results, and list the remaining search results on the bottom. In some embodiments, if the N search results are completely the same as the M search results, the N search results or M search results may be directly used as the search results.

In 110, the device may return the sorted search results to the user equipment that started the search request. When all search results have been sorted in 108, the sorted search results may be returned to the user equipment in the format of a list, e.g. delivering abstracts or webpages of the links of the sorted search results to the user equipment.

The corresponding relations among the keyword, the search results and the transaction parameters of the search results used in 106 are determined after studying the queries made by a large amount of users on the search results, as well as purchase behavior based on the search results within a set period.

The device may collect search requests that contain keywords submitted by users within a set period. The set period may be set as needed. To acquire more abundant data for determining the corresponding relations, the set period may be set to a longer period; to acquire the latest data for determining the corresponding relations, the set period may be set to a shorter period and the collected data may be updated periodically.

The device may use each keyword as the search condition to search the database server, and determine a search result group corresponding to each keyword that contains at least one search result. Assume that the keywords received within the set period include "Brand A" and "cell phone". Search with "Brand A" as the search condition to obtain the search result group 1, which includes search results of "Cell phone A", "Monitor A" and "Game machine A"; search with "cell phone" as the search condition to obtain the search result group 2, which includes search results of "Cell phone A", "Cell phone B" and "cell phone accessories".

The device may determine, for each search result, a click index of the search result and a purchase index generated after clicking the search result when the keyword corresponding to the search result group thereof is used as the search condition.

Regarding the search result "Cell phone A", the search result groups including "Cell phone A" may include the search result group 1 and the search result group 2. When a user uses the keyword "Brand A" that the search result group 1 corresponds to as the search condition and obtains the search result "Cell phone A", the click index and the purchase index of "Cell phone A" are determined in such a circumstance. When the user uses the keyword "cell phone" that the search result group 2 corresponds to as the search condition and obtains the search result "Cell phone A", the click index and the purchase index of "Cell phone A" are determined in such a circumstance, so on and so forth. The click indexes and the purchase indexes under certain keywords are obtained for all search results.

In some embodiments, the click index may represent a number of times that a search result is queried under certain keyword. In these instances, when the keyword corresponding to the search result group that the search result belongs to is used as the search condition, the click index may represent the number of times that the obtained search result is queried. The number of times of queries includes the amount of users who query or investigate the search result or the number of times that the search result is queried. For example, when 50 users click on the search result, "Brand A cell phone", which is obtained by using "Brand A" as the search condition, there are a total of 200 clicks to query or to investigate. Then, the click index of "Brand A cell phone" under the keyword "Brand A" can be preset to 50 as the number of users or 200 as the number of clicks to query or investigate.

In some embodiments, the purchase index may represent the number of times of purchases made after a search result is queried under certain keyword. In these instances, when the keyword corresponding to the search result group that the search result belongs to is used as the search condition and after the obtained search result is queried by users, the purchase index may represent the number of times that the users purchase the corresponding product based on the query results. The number of times of purchases includes the amount of users who have made purchases or the number of times of purchases based on queries on the search result. For example: when 50 users click on the search result, "Brand A cell phone", which is obtained by using "Brand A" as the search condition, there are a total of 200 clicks to query or investigate and 8 users purchased Brand A cell phone after the clicks to query or investigate. These 8 users made a total of 12 times of purchases of "Brand A cell phone". Then, the purchase index of "Brand A cell phone" under the keyword "Brand A" is 8 as the number of purchasing users or 12 as the accumulative number of purchases.

The click indexes and the purchase indexes under certain keywords can be obtained for each of the search results. The click index and the purchase index of each search result under a keyword are recorded as a field, and the field at least comprises: <keyword>, <search result>, <the click index of the search result under the keyword>, and <the purchase index of the search result under the keyword>. A list structure shown in Table 1 can be developed by combining the fields of click indexes and purchase indexes of all search results under their respective keywords that are collected in the second operation. The list structure shown in Table 1 uses the number of times that a search result is queried as the click index of the search result, and the number of times of purchases based on queries on the search result as the purchase index of the search result.

TABLE 1

| Keyword | Search result | Click index | Purchase index |
|---|---|---|---|
| Brand A | Cell phone A | 200 | 12 |
| Brand A | Monitor A | 150 | 6 |
| Brand A | Game machine A | 300 | 9 |
| Cell phone | Cell phone A | 200 | 8 |
| Cell phone | Cell phone B | 500 | 50 |
| Cell phone | Cell phone accessories | 250 | 10 |

The device may, based on the click index and purchase index, generate a transaction parameter as the transaction parameter that the search result corresponds to when the keyword corresponding to the search result group is used as the search condition.

When the list structure shown in Table 1 is obtained, the click index and the purchase index in each field in Table 1 can be calculated to obtain the transaction parameter of the search result under certain keyword. The methods to calculate transaction parameter include but are not limited to the following three methods and variations of these three methods.

The first method to calculate a transaction parameter is provided below.

$$Z = \frac{X}{Y} \quad \text{(Equation 1)}$$

Wherein, Z represents the transaction parameter of the search result; X represents the purchase index of the search result; and Y represents the click index of the search result.

The second method to calculate a transaction parameter is provided below.

$$Z = \frac{X - X'}{Y} \quad \text{(Equation 2)}$$

Wherein, $X^I$ represents the variance of the purchase indexes of all search results in the search result group to which the search result belongs.

The third method to calculate transaction parameter is provided below.

$$Z = \frac{X}{Y + Y'} \quad (3)$$

Wherein, $Y^I$ represents the variance of the click indexes of all search results in the search result group to which the search result belongs.

It should be noted that in the above Equations 1-3, the purchase index may be either the amount of users who have made purchases or the number of times of purchases; the click index may be either the amount of users who query or investigate the search result or the number of times that the search result is queried. When calculating the transaction parameter for each search result, the calculated transaction parameter can reflect the rate of successful transactions of the search result under certain keyword. In these instances, the purchase index and the click index of each search result used in the calculation may have the same meaning. For the calculation of each search result, for example, the purchase index may be the number of times of purchases and the click index may be the number of times that the search result is queried. Alternatively, the purchase index may be the amount of users who have made purchases and the click index may be the number of times that the search result is queried.

Assume that the purchase index is the number of times of purchases and the click index is the number of times that the search result is queried. As a result, the list structure shown in Table 1 can be changed to the list structure shown in Table 2. At this point, the corresponding relations among the keyword, the search results and the transaction parameters of the search results may be obtained.

TABLE 2

| Keyword | Search result | Transaction parameter |
|---|---|---|
| Brand A | Cell phone A | 0.06 |
| Brand A | Monitor A | 0.04 |
| Brand A | Game machine A | 0.03 |
| Cell phone | Cell phone A | 0.04 |
| Cell phone | Cell phone B | 0.1 |
| Cell phone | Cell phone accessories | 0.04 |

In 106, upon receiving a search request that contains the keyword "Brand A", transaction parameters of different search results under the keyword can be obtained by querying Table 2. The search results that have transaction parameters reaching a set threshold value may be then treated as the N search results with transaction parameters meeting the set condition, and subsequent operations are performed.

To develop the corresponding relations among the keyword, the search results and the transaction parameters of the search results in the present embodiment, various source data acquisition means may be employed to obtain data needed, e.g. the source data are obtained by analyzing the log information and the list structure shown in Table 2 is further obtained.

The specific way of implementing 108 may be different depending on different scenarios in which the M search results and the N search results are sorted. The M search results may be sorted according to correlation from high to low, or may not have a sorted sequence but carry the correlation score for every search result. The correlation score indicates the correlation between the search result and the keyword. Search results having higher correlation will have higher corresponding correlation scores.

Similarly, the N search results may be sorted according to transaction parameter from high to low, or do not have a sorted sequence but carry the transaction volume scores for the search results. The transaction volume score indicates the rate of successful transactions for the search results. Search results having higher transaction parameters will have higher corresponding transaction volume scores.

Depending on different scenarios in which the M search results and the N search results are sorted or not, the implementation of operation 108 may vary.

In some embodiments, the M search results are sorted according to the correlation from high to low and the N search results are sorted according to the transaction parameter from high to low. Since both the N search results and the M search results have been sorted, the N search results that have been sorted according to the transaction parameter from high to low may be directly listed on the top, and other search results in the M search results that are not the same as the N search results are listed on the bottom according to the correlation with the keyword from high to low. When the M search results are not sorted, they can also be sorted according to the correlation score of each search result. When the N search results are not sorted, they can also be sorted according to the transaction volume score of each search result, thereby obtaining the M search results and the N search results that are sorted.

In some embodiments, the M search results do not have correlation scores and have been sorted according to the correlation from high to low, and the N search results have transaction volume scores and have not been sorted yet. In these instances, when the N search results are sorted according to the transaction volume score from high to low, the N search results that have been sorted according to the transaction volume score from high to low may be directly listed on the top, and other search results in the M search results that are not the same as the N search results are listed on the bottom according to the correlation with the keyword from high to low.

In some embodiments, the M search results have correlation scores but have not been sorted yet, and the N search results do not have transaction volume scores but have been sorted according to the transaction parameter from high to low. In these instances, the device may treat the M search results as search results in a queue to be processed. Search results in the queue to be processed are search results that will be ultimately output to users, and the queue to be processed can be seen as an interim queue for integrating the M search results and the N search results.

Assuming that the M search results in this operation are: "Cell phone A", "Computer A" and "Game machine A", and at this point, the content of the queue to be processed is: [Cell phone A (correlation score 1), Computer A (correlation score 2), Game machine A (correlation score 3)]. As a result, the device may read every search result from the N search results according to the corresponding transaction parameter from high to low.

Assuming that after being sorted according to the transaction parameter from high to low in this operation, the sequence of the N search results is: "Cell phone A", "Monitor A" and "Game machine A". For every read search result, the device may carry out the following operations cyclically until all of the N search results are read. The device may read the 1st search result, "Cell phone A", in the N search results, and determine whether the queue to be processed has the search result, "Cell phone A". Since the queue to be processed has the search result, "Cell phone A", it means that the search result, "Cell phone A", is both a search result having a high rate of successful transactions and a search result having high correlation with the keyword. This result is a result that mostly likely meets the user's search need.

As a result, the sum of correlation score 1 of "Cell phone A" and weighted value 1 of "Cell phone A" in the N search results is used as a correlation score of "Cell phone A" in the queue to be processed.

At this point, the content of the queue to be processed may be updated to: [Cell phone A (correlation score 1+weighted value 1), Computer A (correlation score 2), Game machine A (correlation score 3)].

The device may then read the 2nd search result, "Monitor A", in the N search results. Since the queue to be processed does not have "Monitor A", "Monitor A" is written into the queue to be processed, and the weighted value 2 of "Monitor A" in the N search results is used as the correlation score of "Monitor A".

At this point, the content of the queue to be processed is updated to: [Cell phone A (correlation score 1+weighted value 1), Computer A (correlation score 2), Game machine A (correlation score 3), Monitor A (weighted value 2)].

The device may then read the 3rd search result of the N search results, "Game machine A". Since the queue to be processed has the search result, "Game machine A", the sum of the correlation score 3 of "Game machine A" and the weighted value 3 of "Game machine A" in the N search results may be used as the correlation score of "Game machine A" in the queue to be processed.

At this point, the content of the queue to be processed is updated to: [Cell phone A (correlation score 1+weighted value 1), Computer A (correlation score 2), Game machine A (correlation score 3+weighted value 3), Monitor A (weighted value 2)].

The weighted values of the N search results may be assigned in advance, wherein search results having higher transaction parameters will be assigned higher weighted values, i.e. in the N search results that have been sorted according to the transaction parameter from high to low, the weighted values assigned to the search results listed on the top are higher than the weighted values assigned to the search results listed on the bottom.

When all of the N search results have been read, the search results in the queue to be processed may be listed according to the correlation score from high to low.

In some embodiments, the correlation scores of the search results in the queue to be processed may further be obtained by weighting the correlation scores and the weighted values.

In some embodiments, the M search results have correlation scores but have not been sorted yet, and the N search results have transaction volume scores but have not been sorted either. The device may treat the M search results as search results in a queue to be processed.

Assuming again that the M search results in this operation are: "Cell phone A", "Computer A" and "Game machine A", and at this point, the content of the queue to be processed is: [Cell phone A (correlation score 1), Computer A (correlation score 2), Game machine A (correlation score 3)]. The content of the N search results is [Cell phone A (transaction volume score 1), Monitor A (transaction volume score 2), Game machine A (transaction volume score 3)].

At this point, the sequence of the N search results may not be sorted according to the transaction volume score from high to low. The device may read every search result from the N search results (each search result of the N search results may be read in any random sequence), and carrying out the following operations on every read search result cyclically until all of the N search results are read.

The device may read the 1st search result, "Cell phone A", in the N search results, and determining if the queue to be processed has the search result, "Cell phone A". Since the queue to be processed has the search result, "Cell phone A", the sum of the correlation score 1 of "Cell phone A" and the transaction volume score 1 of "Cell phone A" is used as the correlation score of "Cell phone A" in the queue to be processed.

At this point, the content of the queue to be processed is updated to: [Cell phone A (correlation score 1+transaction volume score 1), Computer A (correlation score 2), Game machine A (correlation score 3)]. The device may then read the 2nd search result, "Monitor A", in the N search results. Since the queue to be processed does not have "Monitor A", "Monitor A" is written into the queue to be processed, and the transaction volume score 2 of "Monitor A" is used as the correlation score of "Monitor A".

At this point, the content of the queue to be processed is updated to: [Cell phone A (correlation score 1+transaction volume score 1), Computer A (correlation score 2), Game machine A (correlation score 3), Monitor A (transaction volume score 2)].

The device may read the 3rd search result of the N search results, "Game machine A". Since the queue to be processed has the search result, "Game machine A", the sum of the correlation score 3 of "Game machine A" and the transaction volume score 3 of "Game machine A" may be used as the correlation score of "Game machine A" in the queue to be processed.

At this point, the content of the queue to be processed is updated to: [Cell phone A (correlation score 1+transaction volume score 1), Computer A (correlation score 2), Game machine A (correlation score 3+transaction volume score 3), Monitor A (transaction volume score 2)].

When all of the N search results have been read, the search results in the queue to be processed are listed according to the correlation score from high to low.

It should be noted that in some embodiments, the correlation scores of the search results in the queue to be processed may further be obtained by weighting the correlation scores and the transaction volume scores.

In some embodiments, if there are many search results in the queue to be processed, only a number of optimal search results may be displayed. Prior to displaying the search results to a user, a number of optimal search results in the queue to be processed may be sorted and then output to a display device for display. Alternatively, instead of sorting a number of optimal search results in the queue to be processed, these search results and their correlation scores are sent to the display device, and the display device will sort the received search results based on the received correlation scores and then display the same.

Figure 2:
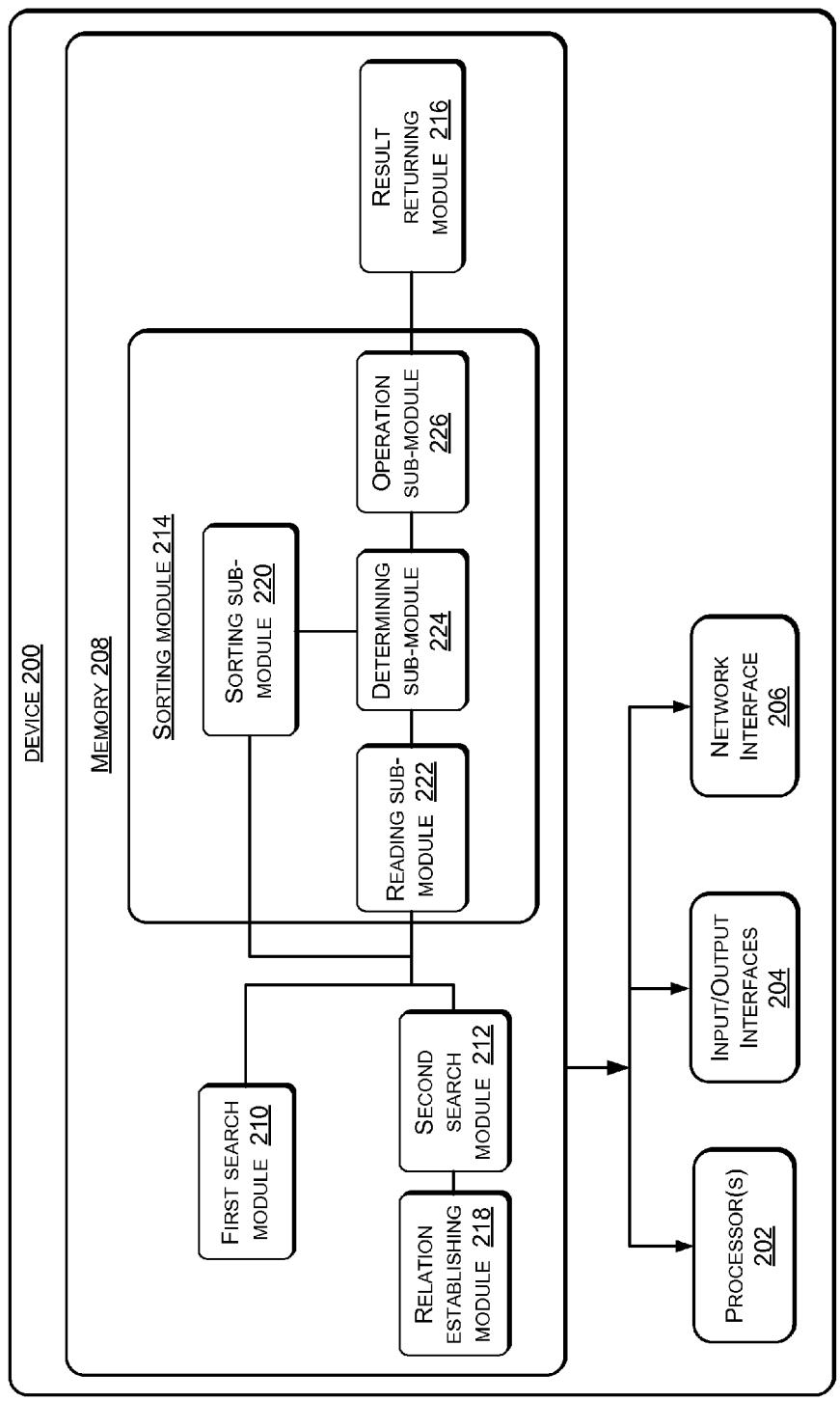
FIG. 2 is a block diagram of an illustrative device that may conduct searches.

FIG. 2 is a block diagram of an illustrative device 200 that may conduct searches. The device 200 may be configured as any suitable server(s). In one exemplary configuration, the server 200 include one or more processors 202, input/output interfaces 204, network interface 206, and memory 208.

The memory 208 may include computer-readable media in the form of volatile memory, such as random-access memory (RAM) and/or non-volatile memory, such as read only memory (ROM) or flash RAM. The memory 208 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

Turning to the memory 208 in more detail, the memory 208 may store a first search module 210, a second search module 212, a sorting module 214 and a result returning module 216. The first search module 210 may receive a search request that contains a keyword, using the keyword as the search condition to obtain M search results by searching the database server. The second search module 212 may determine N search results based on the corresponding relations among the keyword, the search results and the transaction parameters of the search results. The N search results may correspond to the received keyword and have transaction parameters satisfying a set condition. The sorting module 214 may rank and list the N search results on the top and listing other search results in the M search results that are not the same as the N search results on the bottom. The result returning module 216 may return the sorted search results to a user device. In some embodiments, the first search module 210 may be a search engine for search.

The memory 208 may also store a relation establishing module 218. The relation establishing module 218 may collect search requests that contain keywords received within a set period, use each keyword as the search condition to search the database server, respectively, and determine a search result group corresponding to each keyword that contains at least one search result. For each search result, the relation establishing module 218 may determine the click index of the search result and the purchase index generated after clicking the search result when the keyword corresponding to the search result group thereof is used as the search condition. The relation establishing module 218 may also, based on the click index and purchase index, generate a transaction parameter as the transaction parameter that the search result corresponds to when the keyword corresponding to the search result group thereof is used as the search condition. In some embodiments, the relation establishing module 218 may generate the Table 2.

Based on the M search results and the N search results obtained by the first search module 210 and the second search module 212 are sorted, the sorting module 214 may sort search results accordingly.

When the M search results are sorted according to the correlation with the keyword from high to low and the N search results are sorted according to the corresponding transaction parameter from high to low, the sorting module 214 may list the N search results on the top, and lists other search results in the M search results that are not the same as the N search results on the bottom according to the correlation with the keyword from high to low.

In some embodiments, the sorting module 214 may include a sorting sub-module 220, a reading sub-module 222, a determining sub-module 224 and a operation sub-module 226. The scoring sub-module 220 may decide the correlation score for every search result in the M search results. The reading sub-module 222 may sequentially read every search result of the N search results according to the corresponding transaction parameter from high to low until all of the N search results are read. The determination sub-module 224 may treat the M search results as search results in a queue to be processed, and determine if the queue to be processed has the read $i^{th}$ search result. If no, the weighted value assigned to the $i^{th}$ search result becomes the correlation score of the search result and is written into the queue to be processed. If yes, the sum of the weighted value assigned to the $i^{th}$ search result and the correlation score of the $i^{th}$ search result may be used as the new correlation score of the $i^{th}$ search result, the i being a positive integer of a value between 1 and N. The operation sub-module 226 may list the search results in the queue to be processed according to the correlation score from high to low when all of the read N search results are considered by the determination sub-module 224.

In some embodiments, the scoring sub-module 220 may decide the correlation score for every search result in the M search results and the transaction volume score for every search result in the N search results. The reading sub-module 222 may read every search result in the N search results until all of the N search results are read. The determination sub-module 224 may treat the M search results as search results in a queue to be processed, and determine if the queue to be processed has the read $i^{th}$ search result. If no, the transaction volume score of the $i^{th}$ search result becomes the correlation score of the search result and is written into the queue to be processed. If yes, the sum of the transaction volume score of the $i^{th}$ search result and the correlation score of the $i^{th}$ search result may be used as the new correlation score of the $i^{th}$ search result, the i being a positive integer of a value between 1 and N. The operation sub-module 226 may list the search results in the queue to be processed according to the correlation score from high to low when all of the read N search results are considered by the determination sub-module.

Figure 3:
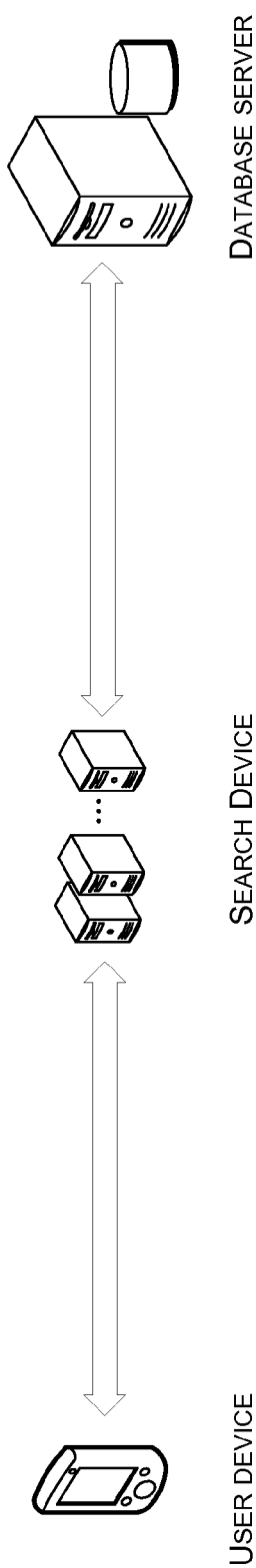
FIG. 3 is a block diagram of an illustrative environment that supports conducing searches.

The device 200 may be applied in a system architecture shown in FIG. 3. The system architecture shown in FIG. 3 may include a user device, a device and a database server. The user equipment may send search request that contains a keyword to the device. The device searches the database server using the keyword as the search condition and sorts the search results according to the technologies in the embodiments of the present application. The device may then return the same to the user equipment, thereby fulfilling the search request by the user equipment. The device may be applied in other system architectures.

The specific examples herein are utilized to illustrate the principles and embodiments of the application. The description of the embodiments above is designed to assist in understanding the method and ideas of the present disclosure. However, persons skilled in the art could, based on the ideas in the application, make alterations to the specific embodiments and application scope, and thus the content of the present specification should not be construed as placing limitations on the present application.

What is claimed is:

1. One or more computer-readable media storing computer-executable instructions that, when executed by one or more processors, instruct the one or more processors to perform acts comprising:
    receiving a query by a server, the query including a keyword;
    obtaining multiple search results based at least in part on the keyword, wherein the multiple search results include:
        a first set of search results determined based on literal correlations with the keyword; and
        a second set of search results including one or more search results that are not in the first set of search results, each individual search result of the second set of search results being determined based at least in part on correlations among the keyword and transactional parameters, each individual transactional parameter of the transactional parameters being determined based on a ratio of a number of users purchasing one or more items associated with an individual search result to a number of users investigating the individual search result; and
    assigning the second set of search results a higher priority than the first set of search results.

2. The one or more computer-readable media of claim 1, further comprising removing, from the first set of search results, a search result that is substantially same as a particular search result of the second set of search results.

3. The one or more computer-readable media of claim 1, wherein the transactional parameters satisfy a predetermined condition.

4. The one or more computer-readable media of claim 1, wherein the individual transactional parameter is determined further based on a number of times that one or more users investigate the individual search result in a predetermined time period.

5. The one or more computer-readable media of claim 1, wherein the individual transactional parameter is determined further based on a number of times that one or more users purchase one or more items associated with the individual search result in a predetermined time period.

6. A method for searching, comprising:
    receiving a query including a keyword;
    obtaining multiple search results based at least in part on the keyword, wherein the multiple search results include:
        a first set of search results determined based on literal correlations with the keyword; and
        a second set of search results including one or more search results that are not in the first set of search results, each individual search result of the second set of search results being determined based at least in part on correlations among the keyword and transactional parameters, each individual transactional parameter of the transactional parameters being determined based on a ratio of a number of users purchasing one or more items associated with an individual search result to a number of users investigating the individual search result; and
    assigning the second set of search results a higher priority than the first set of search results.

7. The method of claim 6, further comprising:
    ranking the first set of search results based on relevancies between the first set of search results and the keyword; and
    ranking the second set of search results based on the transactional parameters, wherein a first search result of the second set of search results that corresponds to a first transactional parameter is ranked higher than a second search result of the second set of search results that corresponds to a second transactional parameter, the first transactional parameter being higher than the second transactional parameter.

8. The method of claim 6, wherein the individual transactional parameter is determined further based on a number of times that one or more users investigate the individual search result in a predetermined time period.

9. The method of claim 6, wherein the individual transactional parameter is determined further based on a number of times that one or more users purchase one or more items associated with the individual search result in a predetermined time period.

10. A computing device comprising:
    one or more processors; and
    memory to maintain a plurality of components executable by the one or more processors, the plurality of components comprising:
        a first search module configured to:
            receive a query including a keyword, and
            conduct a search to obtain a first set of search results based on literal correlations with the keyword;
        a second search module configured to determine a second set of search results including one or more search results that are not in the first set of search results, each individual search result of the second set of search results being determined based at least in part on correlations among the keyword and transactional parameters that individually satisfy at least one predetermined condition, each individual transactional parameter of the transactional parameters being determined based on a ratio of a number of users purchasing one or more items associated with the individual search result to a number of users investigating the individual search result; and
        a sorting search module configured to assign the second set of search results a higher priority than the first set of search results.

11. The computing device of claim 10, wherein the sorting search module is further configured to:
    determine a search result of first set of search results or the second set of search results;
    assign a weighted value to the search result based on a corresponding transactional parameter; and
    rank the search result based on the weighted value and a correlation score that corresponds to a relevancy between the keyword and the search result.

12. The computing device of claim 10, wherein the sorting search module is further configured to remove from the first set of search results a search result that is substantially same as one search result of the second set of search results.

13. The computing device of claim 12, further comprising a result returning module configured to return to a user device the second set of search results and the first set of search results, the second set of search results being listed prior to the first set of search results.

14. The method of claim 6, wherein:
the number of users purchasing one or more items associated with the individual search result represents a purchase index;
the number of users investigating the individual search result represents a click index; and
the individual transactional parameter is determined further based on a variance of purchase indexes of the second set of search results or a variance of click indexes of the second set of search results.

15. The computing device of claim 10, wherein the individual transactional parameter is determined further based on a number of times that one or more users investigate the individual search result in a predetermined time period.

16. The computing device of claim 10, wherein the individual transactional parameter is determined further based on a number of times that one or more users purchase one or more items associated with the individual search result in a predetermined time period.

17. The computing device of claim 10, wherein:
the number of users purchasing one or more items associated with the individual search result represents a purchase index; and
the individual transactional parameter is determined further based on a variance of purchase indexes of the second set of search results.

18. The computing device of claim 10, wherein:
the number of users investigating the individual search result represents a click index; and
the individual transactional parameter is determined further based on a variance of click indexes of the second set of search results.

19. The computing device of claim 10, wherein:
the number of users purchasing one or more items associated with the individual search result represents a purchase index;
the number of users investigating the individual search result represents a click index; and
the individual transactional parameter is determined further based on a variance of purchase indexes of the second set of search results or a variance of click indexes of the second set of search results.

20. The one or more computer-readable media of claim 1, wherein each individual search result of the second set of search results is determined further based at least in part on one or more search results obtained by multiple users that have individually performed a query using the keyword.

* * * * *